United States Patent [19]

Das

[11] Patent Number: 5,075,956

[45] Date of Patent: Dec. 31, 1991

[54] METHOD OF MAKING RECORDING HEADS WITH SIDE SHIELDS

[75] Inventor: Shyam C. Das, Sudbury, Mass.

[73] Assignee: Digital Equipment Corporation, Maynard, Mass.

[21] Appl. No.: 517,558

[22] Filed: Apr. 24, 1990

Related U.S. Application Data

[63] Continuation of Ser. No. 292,397, Dec. 30, 1988, abandoned, which is a continuation-in-part of Ser. No. 168,978, Mar. 16, 1988, Pat. No. 4,935,832.

[51] Int. Cl.⁵ .............................................. G11B 5/42
[52] U.S. Cl. .................................... 29/603; 360/122; 360/124; 360/125
[58] Field of Search ................. 29/603; 360/110, 112, 360/113, 122, 124, 125

[56] References Cited

U.S. PATENT DOCUMENTS

| | | |
|---|---|---|
| 3,355,727 | 7/1963 | Gaubatz . |
| 3,700,828 | 10/1972 | Zacaroli . |
| 3,881,190 | 4/1975 | Brock et al. ...................... 360/113 |
| 3,908,194 | 9/1975 | Romankiw ...................... 360/113 |
| 3,921,217 | 11/1975 | Thompson . |
| 3,947,889 | 3/1976 | Lazzari . |
| 4,071,868 | 1/1978 | Kaminaka et al. ................ 360/113 |
| 4,195,323 | 3/1980 | Lee . |
| 4,255,772 | 3/1981 | Perez et al. . |
| 4,281,357 | 7/1981 | Lee ................................. 29/603 X |
| 4,335,410 | 6/1982 | Neu ................................. 360/123 |
| 4,356,524 | 10/1982 | Watanabe ........................ 360/129 |
| 4,357,640 | 11/1982 | Heinz et al. ...................... 360/119 |
| 4,374,403 | 2/1983 | Oshima et al. .................... 360/113 |
| 4,376,337 | 3/1983 | Kobayashi et al. ................ 29/603 |
| 4,385,334 | 5/1983 | Yanagida .......................... 360/125 |
| 4,425,593 | 1/1984 | Postma . |
| 4,458,279 | 6/1984 | Katz . |
| 4,633,352 | 12/1986 | Mizoguchi et al. . |
| 4,636,897 | 1/1987 | Nakamura et al. ................ 360/119 |
| 4,651,243 | 3/1987 | Daste et al. . |
| 4,652,954 | 3/1987 | Church ............................ 360/120 |
| 4,656,546 | 4/1987 | Mallory . |
| 4,663,685 | 5/1987 | Tsang . |

(List continued on next page.)

FOREIGN PATENT DOCUMENTS

| | | |
|---|---|---|
| 56-165925 | 12/1981 | Japan . |
| 58-111114 | 7/1983 | Japan . |
| 59-54070 | 3/1984 | Japan . |
| 61-48116 | 3/1986 | Japan . |
| 62-129909 | 6/1987 | Japan . |
| 62-89206 | 10/1987 | Japan . |

OTHER PUBLICATIONS

Shew, IBM Technical Disclosure Bulletin, vol. 2, No. 2, Aug. 1959, Shows Two-Pole, Twin-Track Magnetic Read Heads.

Vinal, IBM Technical Disclosure Bulletin, vol. 26, No. 7B, Dec. 1983, Shows a Two-Pole, Twin-Track Magnetic Read Head.

Jeffers, "Magnetoresistive Transducer with Canted Easy Axis", IEEE Transactions on Magnetics, vol. MAG-15, No. 6, Nov. 1979, pp. 1628-1629.

Primary Examiner—Carl E. Hall
Attorney, Agent, or Firm—Fish & Richardson

[57] ABSTRACT

A recording head includes at least one magnetic pole and magnetic side shields adjacent to the pole, the side shields disposed to sheild the pole from adjacent tracks on a magnetic medium. Embodiments are disclosed for both longitudinal and vertical recording in monopole, two-pole, and three-pole heads, including inductive, MR and Hall-type read elements. A magnetic head capable of detecting flux from a target source among a group of sources, includes at least one magnetic pole and a magnetic shield, the shield providing to the pole 360° of magnetic shielding against sensing by the pole of flux other than the target source. Also disclosed is an alternate flux return conductor being separated at the pole tip from the shield section by a non-magnetic insulation layer. A shielded magnetic head may have two outer magnetic poles, the two outer poles acting as the magnetic shield for a center pole, whereby the outer poles can be used for writing and the center pole can be used for reading.

52 Claims, 9 Drawing Sheets

U.S. PATENT DOCUMENTS

| | | | |
|---|---|---|---|
| 4,667,260 | 5/1987 | Perlov et al. | 360/122 |
| 4,672,493 | 6/1987 | Schewe | 360/125 |
| 4,675,766 | 6/1987 | Schewe | 360/123 |
| 4,684,438 | 8/1987 | Lazzari | 156/649 |
| 4,698,711 | 10/1987 | Vinal . | |
| 4,700,252 | 10/1987 | Muraoka et al. . | |
| 4,713,710 | 12/1987 | Soda et al. . | |
| 4,727,643 | 3/1988 | Schewe et al. . | |
| 4,748,525 | 5/1988 | Perlov | 360/110 |
| 4,758,917 | 7/1988 | Gooch . | |
| 4,803,580 | 2/1989 | Mowry . | |
| 4,837,924 | 6/1989 | Lazzari . | |
| 4,891,725 | 1/1990 | Mowry . | |
| 4,907,113 | 3/1990 | Mallary . | |
| 4,912,584 | 3/1990 | Mallary et al. . | |
| 4,935,832 | 6/1990 | Das et al. . | |

METHOD OF MAKING RECORDING HEADS WITH SIDE SHIELDS

This is a continuation of co-pending application Ser. No. 07/292,397, now abandoned, filed on Dec. 30, 1988; inventor Shyam Chandra Das, which application is a continuation-in-part of copending application Ser. No. 168,978 filed Mar. 16, 1988, now U.S. Pat. No. 4,935,832 entitled "Recording Heads With Side Shields" by the same inventor assigned to the assignee of the present application.

BACKGROUND OF THE INVENTION

This invention relates to magnetic recording heads. Magnetic recording heads are used for reading and writing data onto magnetic media such as magnetic disks. Information on the disks is contained in concentric tracks on the disk. As the number of tracks per inch is increased in magnetic recording, cross talk with adjacent tracks becomes more and more of a problem. During write, fringing fields from the write poles can erase or corrupt information on adjacent tracks. During read, flux from adjacent tracks can corrupt the read process. It is therefore desirable to substantially isolate read/write heads from adjacent tracks.

SUMMARY OF THE INVENTION

According to the invention, the recording head includes at least one magnetic pole and magnetic side shields disposed adjacent to the pole, the side shields disposed to shield the pole from adjacent tracks on a magnetic medium. Embodiments are disclosed for both longitudinal and vertical recording in monopole, two pole, and three-pole heads, including inductive, MR and Hall type read elements.

In one aspect of the invention, a recording head has at least one magnetic pole and magnetic side shields disposed adjacent to the at least one pole. The side shields may be saturable or non-saturable and may be made of magnetically soft materials. The shields may be self-grounding. In one embodiment, the shield is NiFe.

In another aspect, a recording head has two magnetic poles separated by a gap and magnetic side shields disposed adjacent the poles, the side shields extending generally perpendicularly to the gap. The poles may be symmetrical or not.

The head may include an inductive sensor, a Hall sensor or an MR sensor. Where the two poles are asymmetric, one of the poles may be magnetic ground with the side shield attached to the magnetic ground pole.

In another aspect, a recording head includes three magnetic poles separated by gaps and magnetic side shields disposed adjacent the poles, the side shields extending generally perpendicularly to the gaps.

In another aspect, a shielded magnetic head has two outer magnetic poles, the two outer poles acting as the magnetic shield for a center pole, whereby the outer poles can be used for writing and the center pole can be used for reading.

In another aspect, a magnetic head capable of detecting flux from a target source among a group of sources includes at least one magnetic pole and a magnetic shield, the shield providing to the pole 360° of magnetic shielding against sensing by the pole of flux from other than the target source. The head may be a monopole type with the tip of the pole encircled by the shield. The shield may be thick or thin relative to the thickness of the tip of the pole. The pole tip may be comprised of high permeability and high magnetic saturation material. In one embodiment, the pole tip material is a CoZr alloy and the shield is of nickel and iron. The pole may be encircled by a solenoidal coil. The shield may include an upper and a lower section joined together on their sides and in the back closure region. Preferably the interior of the upper shield section and of the lower shield section is bowed away from the pole. The pole may be narrow at its tip and may broaden as it extends to the back closure region.

In another aspect, a magnetic head capable of detecting flux from a target source among a group of sources includes at least one magnetic pole, a magnetic shield, the shield providing to the pole 360° of magnetic shielding against sensing by the pole of flux from other than the target source, and an alternate flux return conductor coupled to the shield, the alternate flux return conductor being separated at the pole tip from the shield section by a non-magnetic insulation layer.

In another aspect, a process for forming a monopole head having a pole, a pole tip, and a yoke defining a back closure region, includes the steps of:

(a) providing a substrate workpiece which defines in its top surface a concave feature having desired transverse and longitudinal dimensions, (b) depositing a magnetic layer over the workpiece forming a lower shield section, the shield section having a feature reflecting the concavity of the depressed feature, (c) forming coil winding stripes over the workpiece, (d) filling the lower shield section feature with insulating material, (e) lapping the product of step (d) down to a flat surface, (f) forming a pole upon the flat surface, (g) forming another insulating layer and upper coil windings, the latter in continuity with the existing coil stripes, over the product of step (f), (h) forming an insulating layer with a convex topography over the product of step (g), and (i) forming an upper shield section over the product of step (h) in continuity with the lower shield section and the pole, reflecting the convex topography of step (h).

Step (a) may include forming the depressed feature by laser, ion, chemical or mechanical processing, and may include forming a thin insulating layer over the substrate. The substrate may be AlSiMag and the thin insulating layer may be $Al_2O_3$.

Step (c) may be preceded by the step of depositing an optional insulating layer over the lower shield section. Step (c) also may include forming the ends of the stripes to extend transversely along the track width direction beyond the dimensions of the lower shield feature.

Step (d) may include the insulating material being photoresist and wherein at least a portion of the ends of the stripes, the back closure region, and the lower shield section are exposed for conductivity purposes.

Step (f) may be preceded by the step of forming an alumina layer in the pole tip region of the workpiece.

Preferably the lower shield section has a back closure region which is confined within the transverse dimensions of the lower shield but is located beyond the longitudinal dimensions of the Steps (f) or (g) may be preceded by the step of forming an MR sensor or a Hall sensor to be located adjacent to the pole.

The upper and lower shield sections may be formed thin or thick at least at their tips.

This process may further include the step of forming an alternate flux return conductor coupled to at least one of the shield sections, this shield section separated from the alternate flux return conductor by an insulation layer.

Step (e) may include lapping until continuity is detected between a part of the lapping system and at least one of the formed coil stripes, and adjusting lapping accordingly.

The process may also include the step of forming a via in the back closure region to facilitate connection of the shield sections and the probe.

In another aspect, a magnetic head capable of detecting flux from a target source among a group of sources, includes at least one magnetic pole and a magnetic shield, the shield bowed away from the pole. The shield may provide 360° of magnetic shielding against sensing by the pole of flux from other than the target source. The head may include an MR element coupled to the pole and a biasing conductor coupled to the MR element.

Other advantages and features will become apparent from the following description of the preferred embodiment and from the claims.

BRIEF DESCRIPTION OF THE DRAWING

FIG. 23A is a cross-section taken along the line 1—1 in the plan view of FIG. 23B.

DESCRIPTION OF A PREFERRED EMBODIMENT

Figure 1:
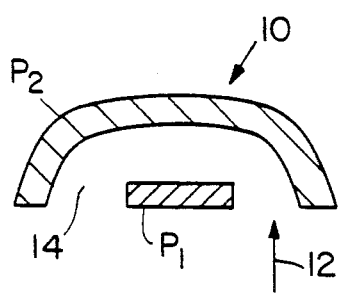
FIG. 1 is a pole tip view of a two-pole head suitable for longitudinal or vertical recording.

The theory on which the present invention is based will be discussed now in conjunction with FIGS. 1 and 2. In FIG. 1, a two pole head 10 suitable for both longitudinal and vertical recording includes a first pole P1 and a second pole P2. Magnetic media (not shown) moves in the direction of an arrow 12 past the head 10 so that the pole P2 is the downstream pole (last seen by the moving media). Note that the downstream pole P2 wraps around the pole P1 providing side shielding, i.e., shielding from adjacent tracks parallel to the direction parallel to the arrow 12. The side shielding in FIG. 1 causes the longitudinal field in the edge region to fall off as $1/R^2$, where R is the distance from the side gap 14. Without the shielding afforded by pole P2 wrapping around pole P1, the field would fall off more slowly (e.g., as $1/R$) so that cross talk in read and write becomes a problem. This relationship applies when the pole 10 of FIG. 1 is used for longitudinal recording.

Figure 2:
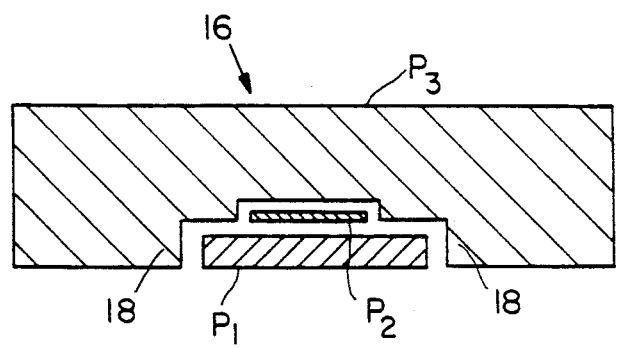
FIG. 2 is a pole tip view of a three-pole head for vertical recording.

The suppression of write fringing in perpendicular recording can be achieved by the geometry of the heads shown in FIGS. 1 and 2. A three-pole head 16 of FIG. 2 is a read/write vertical head. Pole P2 is an inductive or flux sensing read pole. Pole P1 is the write pole and pole P3 is a downstream pole and provides side shield portions 18. When the geometries of FIG. 1 or FIG. 2 are used in perpendicular or vertical recording with a soft magnetic underlayer, the fringing perpendicular field falls exponentially with R. Without the side shields, the field falls off as approximately $1/R$. By using side shields, the thickness of an erase guard band next to an adjacent track can be reduced.

Figure 3:
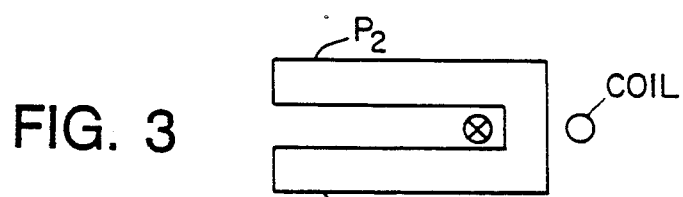
FIG. 3 is a cross-sectional view of a symmetric two-pole head employing an inductive coil.
Figure 4:
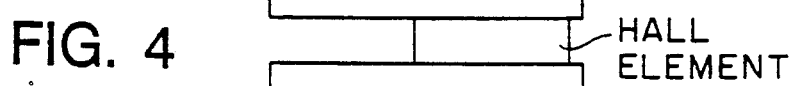
FIG. 4 is a cross-sectional view of a symmetric two-pole head employing a Hall element sensor.
Figure 5:
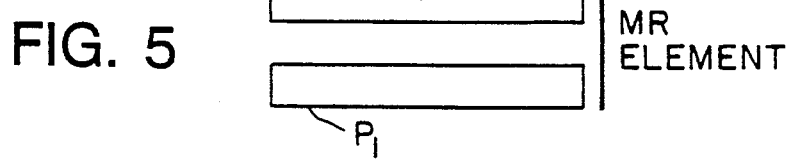
FIG. 5 is a cross-sectional view of a symmetric two pole head employing an MR element.
Figure 6:
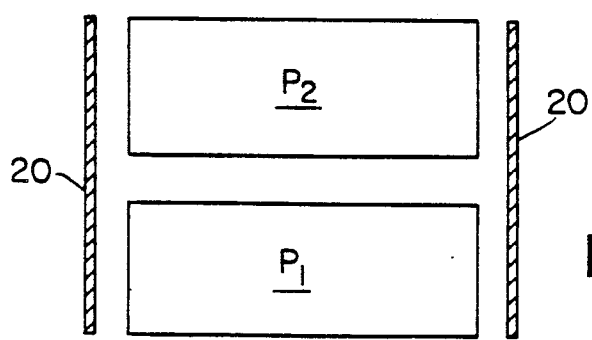
FIG. 6 is a pole tip view of a symmetric two-pole head having saturable side shields.

During readback, side shields can be used to intercept flux from adjacent tracks and to prevent it from passing through the sensor. Keeping the flux out of the sensor can be difficult to achieve because different head symmetry properties call for different approaches. Completely symmetric heads are shown schematically in FIGS. 3, 4 and 5 for inductive, Hall, and MR sensors, respectively, in two-pole heads. For these heads, side shields must intercept the flux and channel it equally into both poles so that no net flux goes through the sensors. Such saturable side shields 20 (FIG. 6) have equal exposure areas to both poles P1 and P2 so that they insert half the flux into each. These thin shields 20 saturate during write so that they do not soak up too much flux during write and thus lead to an overwrite problem. Therefore, they do not reduce write fringing. This can be an advantage in wiping out previous on-track data when there is significant error in track following (this process writes wide and reads narrow). In mechanic sets that have small tracking error, write shielding becomes more of an advantage and can be achieved by thickening the shields 20 so that they do not saturate during write.

Figure 7:
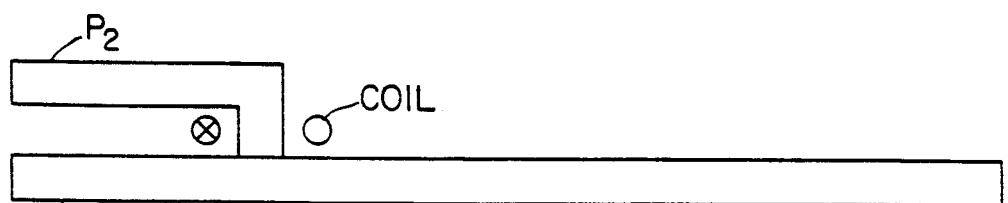
FIG. 7 is a cross-sectional view of an asymmetric two-pole head employing an inductive sensor.
Figure 8:
FIG. 8 is a cross-sectional view of an asymmetric two-pole head employing a Hall element.
Figure 9:
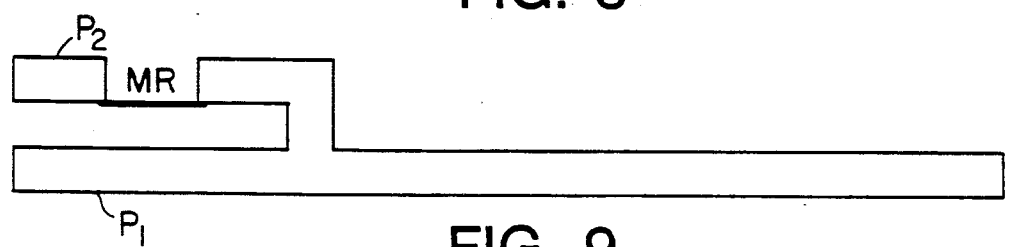
FIG. 9 is a cross-sectional view of an asymmetric two pole head employing an MR sensor.
Figure 10:
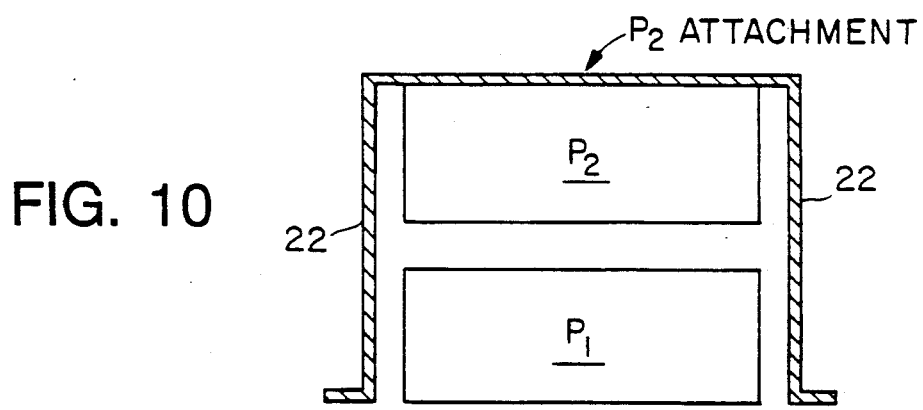
FIG. 10 is a pole tip view of an asymmetric two-pole head having saturable side shields for a grounded P2.
Figure 11:
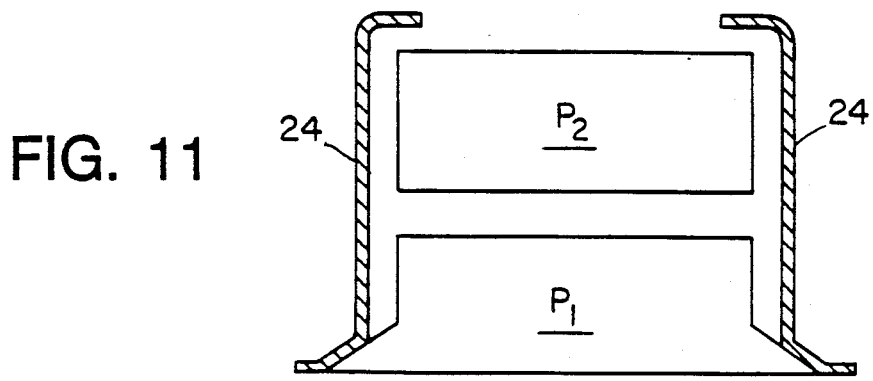
FIG. 11 is a pole tip view of another asymmetric two-pole head having saturable side shields for a grounded P1.

With two-pole heads that are not symmetric, side shields must be attached to the pole which is "magnetic ground" so that the fringing flux bypasses the sensor. Asymmetric heads in which the bottom pole (P1) is ground are shown in FIGS. 7, 8 and 9 for inductive, Hall, and MR sensors, respectively. The pole P1 in these figures is ground because it is so much bigger than the other pole P2 and is the low reluctance path for the flux to get out to infinity. Similarly, the top pole P2 can be made into the grounded pole by making it the big one. FIG. 10 shows side shields 22 used with an asymmetric two pole head with the pole P2 serving as the magnetic ground. The saturable side shields 22 are attached to the pole P2. Similarly, FIG. 11 shows side shields 24 used with an asymmetric two-pole head with the pole P1 serving as the magnetic ground and the saturable side shields 24 are attached to the pole P1. Thickening the side shields 22 and 24 to provide write shielding in the context of low tracking error is feasible for the P2 grounded designs of FIG. 11 and of FIG. 1. However, for longitudinal recording, write shielding with a grounded P1 (FIG. 11) will produce transverse recording which causes undesirable pulse shape effects.

Figure 12:
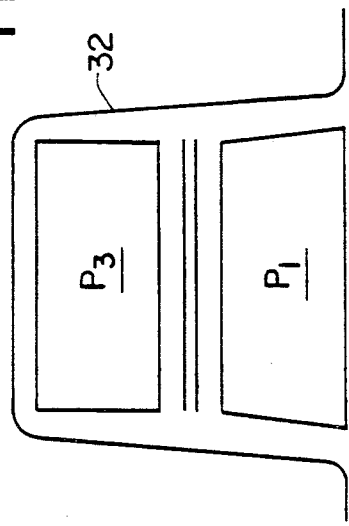
FIG. 12 is a pole tip view of a three-pole head before track trim.
Figure 13:
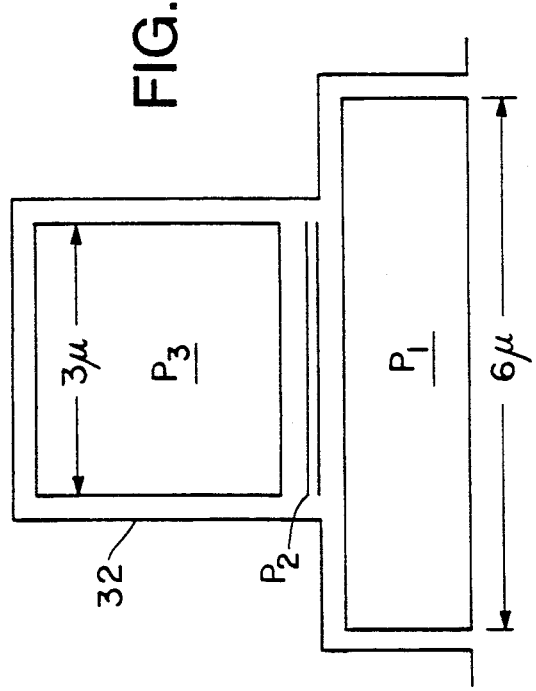
FIG. 13 is a pole tip view of a three-pole head after complete track trim and including shield gap and side shields.
Figure 14:
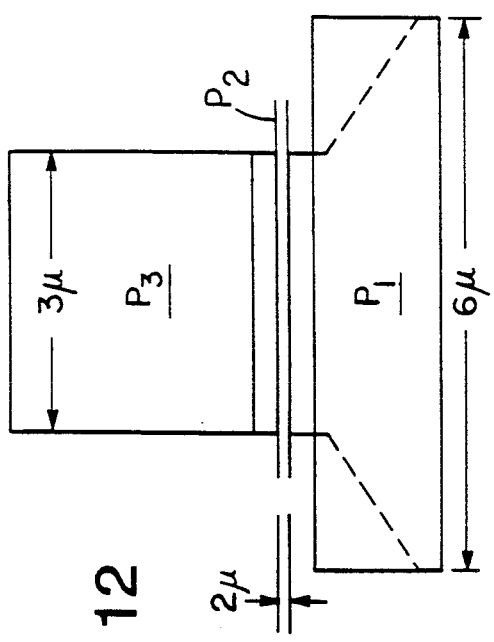
FIG. 14 is a pole tip view of a three-pole head with partial track trim.
Figure 15:
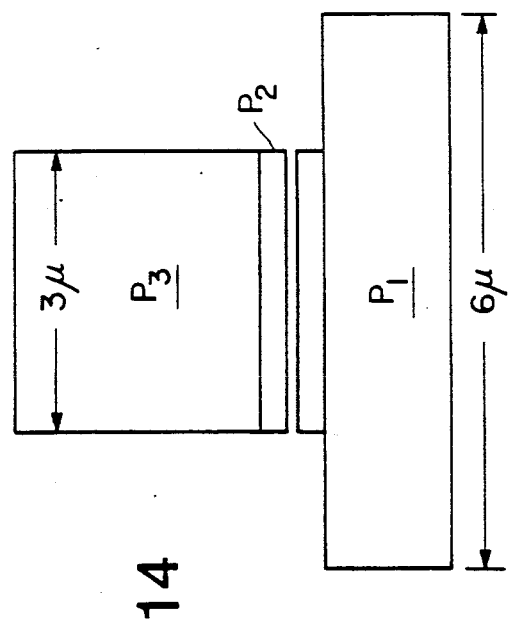
FIG. 15 is a pole tip view of a three-pole head with partial track trim and side shields.

In the case of three-pole heads such as the head 16 of FIG. 2 in which the central pole is used for readback, side shielding is less problematic. The ground poles during readback are the top and bottom poles (P1 and P3). These are the poles that are used for writing. A process for producing a three pole head with side shields is illustrated in FIGS. 12, 13, 14, and 15. FIG. 12 shows a three-pole head structure 30 before ion milling is used to trim the width of the poles P2 and P1 to the width of P3 (which also serves as a mask). After trimming, a gap layer is deposited and a thin NiFe side shield layer 32 (FIG. 13) is sputtered over the structure. The shield 32 is then trimmed off with more ion milling after a mask is placed over the shield 32 so that it is not removed. Variations of this process is shown in FIGS. 14 and 15. During write, the shield 32 saturates and is effectively not there. During read, it intercepts flux from adjacent tracks and channels it into P1 and P3. Little flux gets into P2 (the sense pole) because the area of exposure to P2 is small relative to P1 and P3. In FIGS. 14 and 15, pole P3 is used as a milling mask for pole P2 alone. The head of FIGS. 14 and 15 will have more write fringing than the head in FIG. 13.

Figure 16A:
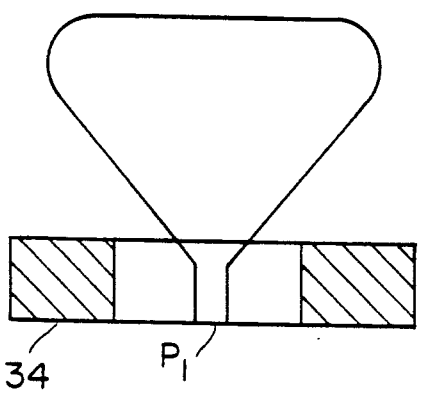
FIGS. 16A and 16B are thematic planar and pole tip views, respectively, of a shielded monopole read/write head, shown primarily for the purpose of describing the pole tip region.
Figure 16C:
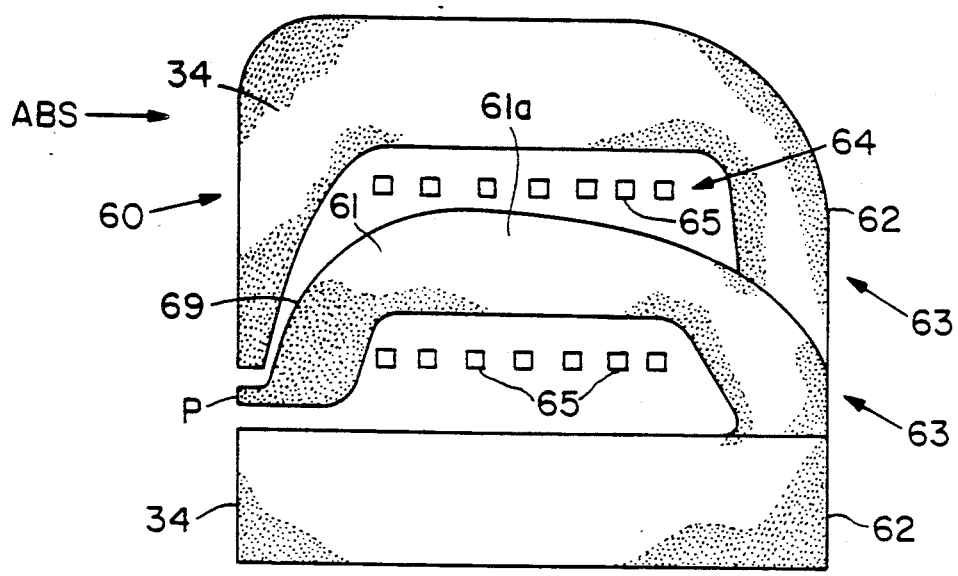
FIG. 16C is a side view of a shielded monopole embodiment of the invention.
Figure 16B:
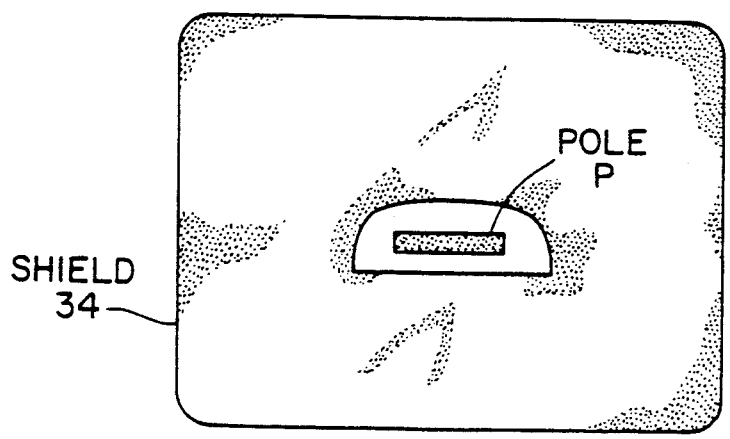

FIGS. 16A and 16B illustrate an embodiment of the invention for use with a monopole type read/write head for vertical recording in which a read/write pole tip P is surrounded by very thick, soft magnetic material 34. The thick, soft magnetic material 34 shields the pole tip P from the flux emerging out of the transitions from the adjacent or the same track during the read operation. During the write operation on vertical media with a soft underlayer, the shield 34 surrounding the pole P prevents the flux from being sprayed in the areas of the adjacent transitions on the same track or on adjacent tracks. This very thick shield dilutes the intensity of the write field (spreads over the thickness of the shield) and thus does not affect already written transitions during the write process. FIG. 16C is a side view illustration of a monopole embodiment of the present invention. The head of FIGS. 16A, 16B and 16C may be inductive or of the flux sensing type.

In a read/write vertical monopole structure 60, such as illustrated in FIGS. 16A, 16B and 16C, the central pole, or probe 61, serves as both the read and write pole. Probe 61 extends from pole tip P to a back closure region 63. A shield 34 surrounds probe 61 (at least at tip P) in order to provide 360 degrees of radial magnetic shielding to the probe (at least at tip P). Shield 34 is also an electrical shield, forming a Faraday cage around the probe. Shield 34 is connected to probe 61 in back closure region 63. Also provided is an inductive coil 64 encircling probe 61 and having a multiplicity of solenoidal windings 65.

Solenoidal coil 64 is preferable over other coil types, such as a pancake coil, since for the same number of turns a solenoidal coil has lower resistance and lower inductance compared to a pancake coil. A low resistance head is desirable since undesirable white noise increases directly with the square root of resistance. Lower inductance is desirable because it will result in a higher resonant frequency. An optimally low inductance would be one where the resonant frequency of the coil is well beyond the operating frequency of the head so as to avoid resonance during operation. Also, lowering of inductance reduces the write circuitry power requirement and yields faster write pulse rise time.

Comparing FIGS. 16B and 16C, it should be understood that shield 34 forms an encircling shield centered about the read/write monopole probe 61. As a result, in the process of reading a transition (or track) on a medium, probe 61 (and tip P) will be insensitive to the flux from adjacent transitions (or tracks). A thick shield will not affect the media in the write operation since the flux is diluted in the shield cross-section exposed to the air bearing surface. In a preferred, but not limiting, embodiment, the ratio of the air bearing surface cross-section of shield to probe may be on the order of 100:1, although 10:1 is not precluded.

Figure 22:
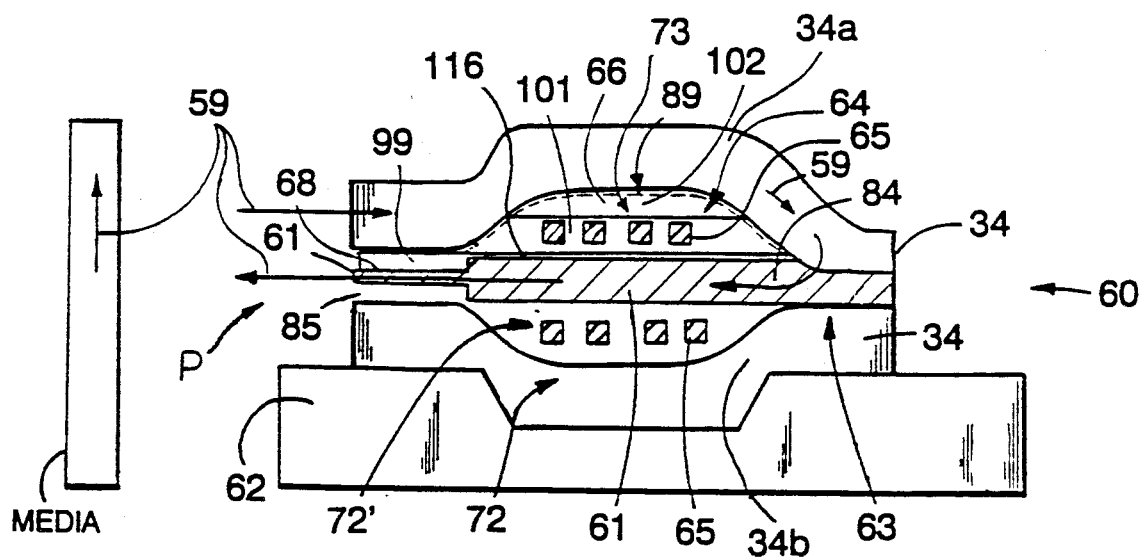
FIG. 22 is a side view of a shielded monopole embodiment of the invention.

Referring now to FIG. 22, an example embodiment of a read/write monopole head 60 is shown formed upon a substrate 62, where sections 34a, 34b of shield 34 are connected in yoke closure region 63 to the end of monopole probe 61. Solenoidal coil 64, having windings 65, is formed around probe 61, similar to the structure shown in FIG. 16C. However, in this embodiment, a depression or cavity 72 is defined in substrate 62 whereby a similar cavity 72' will be defined in the lower section 34b of shield 34 which is formed upon substrate 62. A corresponding inverted cavity 73 is defined preferably in mirror-image under the upper half 34a of shield 34, such as by forming the shield upper half 34a upon an already convexly contoured insulation layer 66. This convex contour may be formed as a part of the layered buildup of the coils and insulator layers after probe 61 has been formed.

Referring again to FIG. 16C, a ramp 69 is shown connecting pole tip P with the main shaft 61a of probe 61. This ramp configuration can result in unwanted coupling of flux between probe 61 (at the ramp) and shield 34, because of the large surface area of the ramp and adjacent shield section and their proximity. To avoid such coupling, probe 61 of the embodiment of FIG. 22 is desirably kept away from the shield as much as possible, where ramp 69 is avoided by having a sleek neck 68. As well, cavities 72', 73 reduce stray coupling between shield 34 and probe 61. This benefit results from creation of a desired flux path (i.e., from the probe to the media to the shield to the back closure region of the probe—see arrows 59) with lower reluctance than the undesired leakage path across the yoke (from pole to shield transverse to the desired flux path of arrows 59). Furthermore, the sleek neck design of FIG. 22 provides a flatter probe topography which is easier to manufacture than the steep ramp structure of FIG. 16C.

Figure 27:
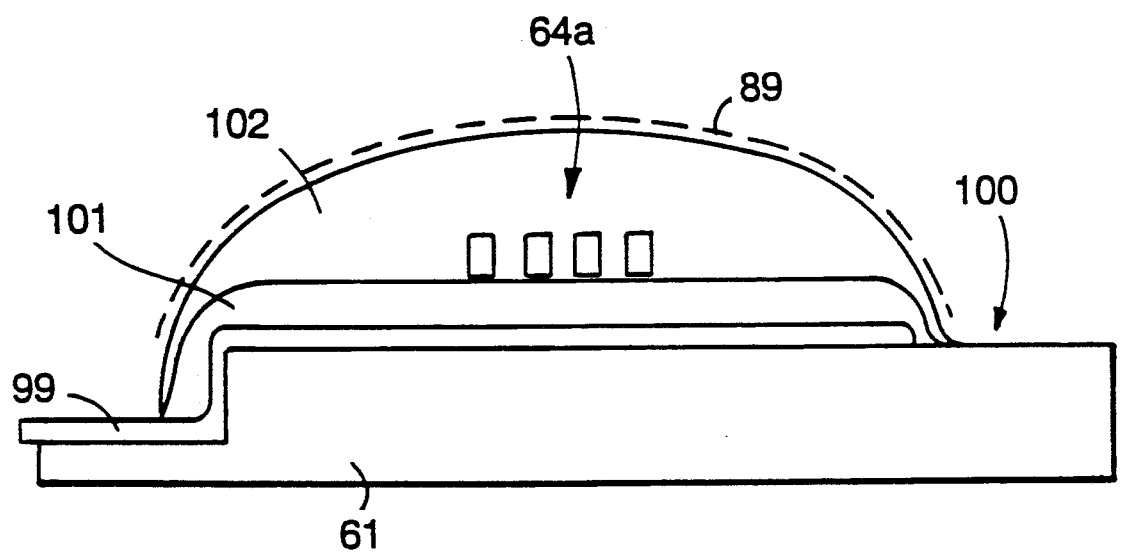
FIG. 27 is a side cross sectional view showing formation of a convex structure above the probe before formation of the upper shield section.

It is preferred, as shown in FIGS. 16C, 22, and 27, that probe 61 be contoured to achieve increased magnetic flux conductance (or reduced reluctance) as it extends from the very thin tip P to the back closure region 63. A very thin pole tip provides better read resolution and also serves to sharply define the write field gradient, but a probe which is too thin will saturate too easily such that the probe will not be functional in the write mode. Hence, a preferred probe 61 is narrow at the pole tip and broadens as it extends away from the tip, and, at least at its tip, is preferably comprised of a material having high permeability and high saturation magnetization such as a cobalt zirconium alloy.

In a process for making a monopole structure such as illustrated above, it is one general approach to deposit a thick magnetic material with a very wide tip cross section as a lower part of the shield. The gap, photoresist insulating material, and coil conducting stripes are formed thereover to form the first half of the solenoidal windings, according to conventional process steps. Thereafter, another insulation layer and probe 61 (which is preferably thinner and narrower in the pole tip region and thicker and wider in the yoke region) are deposited. After this step, another set of gap layer, photoresist insulating layer, and second half of the solenoidal windings, is formed. This completes a solenoidal coil around the probe. Thereafter, another layer of photoresist insulating material is deposited and then a thick magnetic material to form the upper portion of the shield is deposited. The shield upper and lower portions are connected at the back closure region (with the probe) and in the wings of the pole tip region, which forms a complete encircling shield (at least around the pole tip). Alternative conventional techniques may be employed in the above process, including substitution of non-solenoidal transducers, without departing from the spirit and scope of the present invention.

Figure 23A:
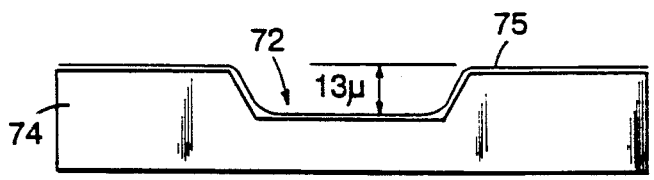
FIGS. 23A,B–25A,B show stages in a preferred process of the invention where
Figure 23B:
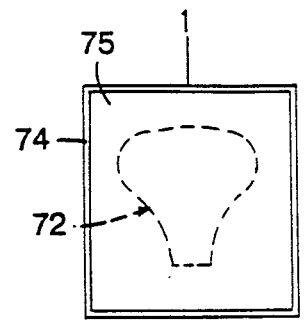

A preferred embodiment of a monopole head will now be illustrated. First, as seen in FIGS. 23A,B, cavity 72 is formed or etched in substrate 74, by laser, ion, chemical or mechanical etching, for example. The substrate may be an insulating material, such as $Al_2O_3$. However, if the substrate is electrically conductive (e.g. AlSiMag), then an insulating material 75, such as $Al_2O_3$, is deposited over the substrate. The $Al_2O_3$ layer 75 may also serve to improve smoothness of the surface of the etched substrate 74.

Figure 24A:
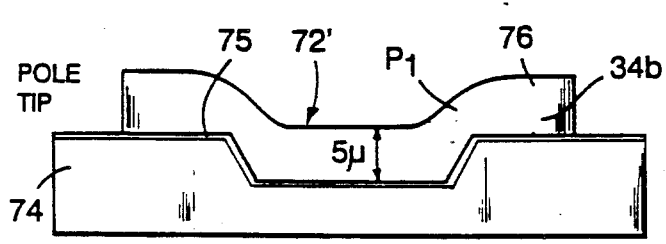
FIG. 24A is a cross-section taken along the line 2—2 in the plan view of FIG. 24B.
Figure 24B:
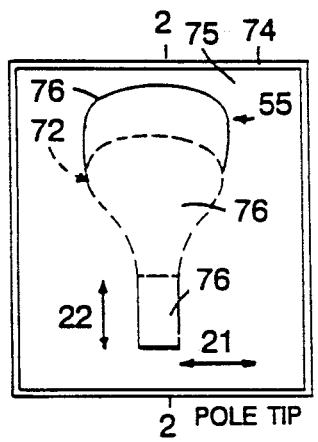

Next, as seen in FIG. 24A,B, a thick magnetic material layer 76 is deposited over substrate 74 (or layer 75) to form the lower section 34b of shield 34. The yoke region of lower section 34b is confined within cavity 72 in the track width direction (the latter indicated by the transverse arrow 21). Shield section 34b extends beyond the cavity toward the pole tip and also in the back closure region 55 in the direction normal to the track width direction (the latter indicated by the longitudinal arrow 22).

Figure 25A:
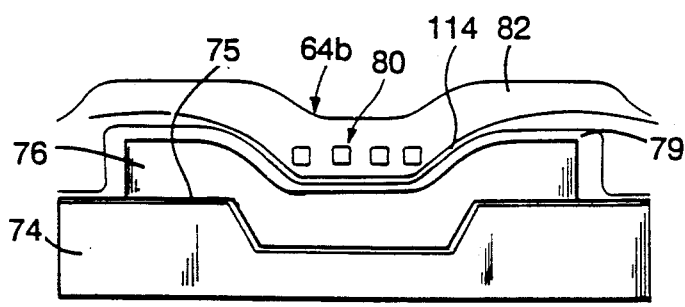
FIG. 25A is a cross-section taken along the line 3—3 in the plan view of FIG. 25B.

Next, as seen in FIG. 25A,B, a thin insulating layer 79 (such as alumina) is deposited over layer 76 (and the out lying portion of layer 75), and a buffer layer 114 is preferably formed in cavity 72'. Coil winding stripes 80 for the lower half 64b of the solenoidal coil 64 are formed over buffer layer 114 in the cavity. The ends 81 of stripes 80 extend over insulator 79 transversely along the track width direction beyond cavity 72' at a height above the top of the cavity to facilitate their subsequent exposure (so as to provide contact points for the second half of the solenoidal coil).

Figure 25B:
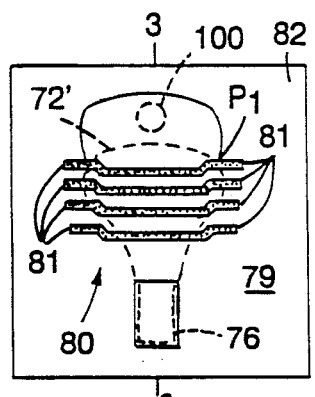

The cavity is now filled with insulating material 82 (not shown in FIG. 25B), such as photoresist or $Al_2O_3$, for example. If the insulating material is photoresist, then the solenoidal coil contact points, the back closure region and the wings of the shield at the pole tip can be exposed using conventional photolithographic techniques. If the insulating material is an alumina type hard material, then the coil contact points might be exposed by mechanical lapping or laser etching, for example. The back closure and the pole tip regions can be opened by various means, such as chemical, for example. In any event, these areas are exposed in order to be able to have continuity with the remaining and yet to be formed coil and shield sections and with the probe. In mechanical lapping, the thickness of the deposited stripe (and/or the pole piece) can be adjusted so as to be used as a lapping benchmark.

Figure 26B:
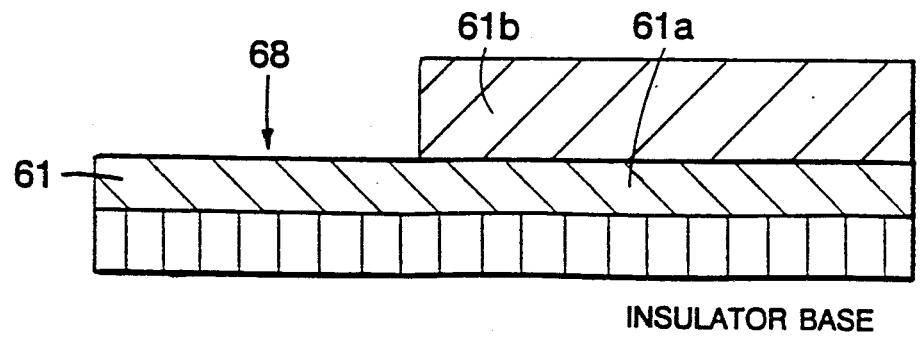
FIG. 26B shows a preferred embodiment of the probe of FIG. 26A.
Figure 26A:
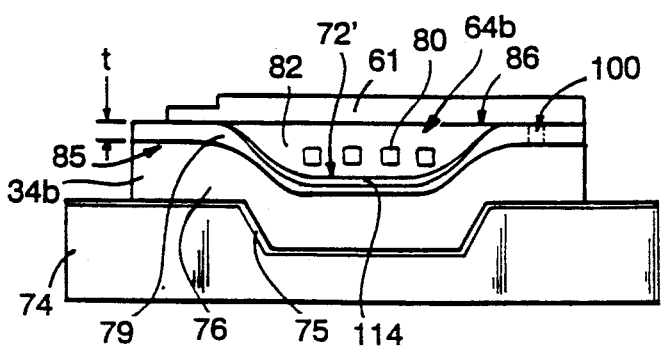
FIG. 26A is a side cross-sectional view of a latter stage of the preferred process.

As seen in FIG. 26A, layers 79 and 82 are lapped down to a top surface 86. Preferably, a thickness t of an alumina layer 79 will remain to form a non-conducting gap insulator section 85 in the pole tip region, although layer 79 typically will extend over the entire workpiece. In this example, probe 61 is formed upon the lapped surface 86, running up the center of the workpiece from tip to back closure region, and is coupled to shield 34 (only lower section 34b is shown in FIGS. 26A,B) through a via 100 formed in a conventional manner (via 100 shown in dotted outline in FIG. 25B).

In manufacture of probe 61, it is convenient to create a thin probe neck 68 by lamination, or perhaps by depositing a thin layer 61A shown in FIG. 26B over insulator base (which may actually comprise several insulator layers planarized to receive layer 61A). A thickening layer 61B is preferably plated over a portion of layer 61A.

The workpiece of FIG. 26A may be completed such as shown in FIG. 27, where upper gap insulator layer 99 covers the probe top surface, except where it is etched away in the back closure region at via area 100. Next, a masked photoresist layer 101 is provided to isolate the upper coil windings section 64a of coil 64 from the probe.

Another insulating layer 102 is then formed over this structure. It will be appreciated by those skilled in the art that these steps can result in a convex topography as indicated by dotted line 89 in FIG. 27. The upper section 34a of shield 34 can be formed over this convex form, thus to produce a cavity 73 which is a relative mirror-image of cavity 72'.

Figure 28:
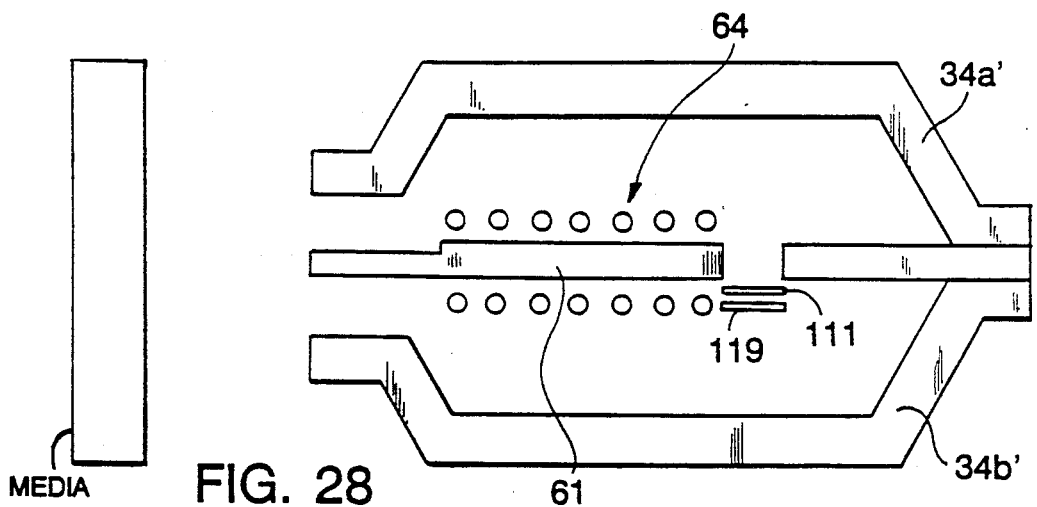
FIGS. 28 29 show MR and Hall embodiments of the invention.
Figure 29:
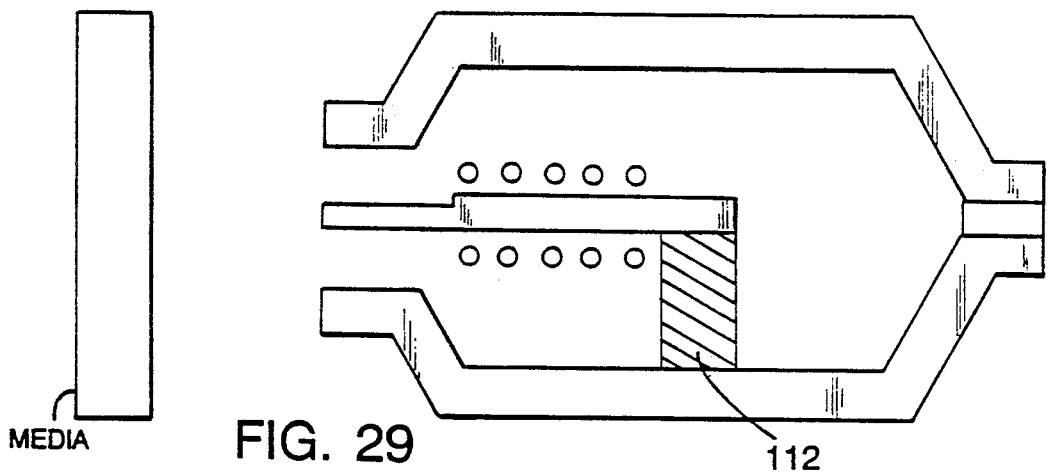

FIG. 28 is a simplified rendering of an alternative embodiment of the invention having an MR read sensor 111. In this case, coil 64 drives probe 61 in the write mode and MR sensor 111 senses flux in probe 61 from the medium in the read mode. In addition, the MR element may be accompanied by a conductor 119 to facilitate transverse and longitudinal biasing of the MR element. FIG. 29 shows another alternative, but with a Hall read element 112. The advantage of MR and Hall sensors is that they are velocity independent and have high signal sensitivity. The MR or Hall elements may be formed above or below the probe without departing from the spirit and scope of the present invention.

In some embodiments, a very thin shield is desirable since it will saturate in the write mode but will be effective in the read mode. This will enable writing of a wide track and reading of a narrow track, as will provide greater ease and accuracy in track following.

Figure 30:
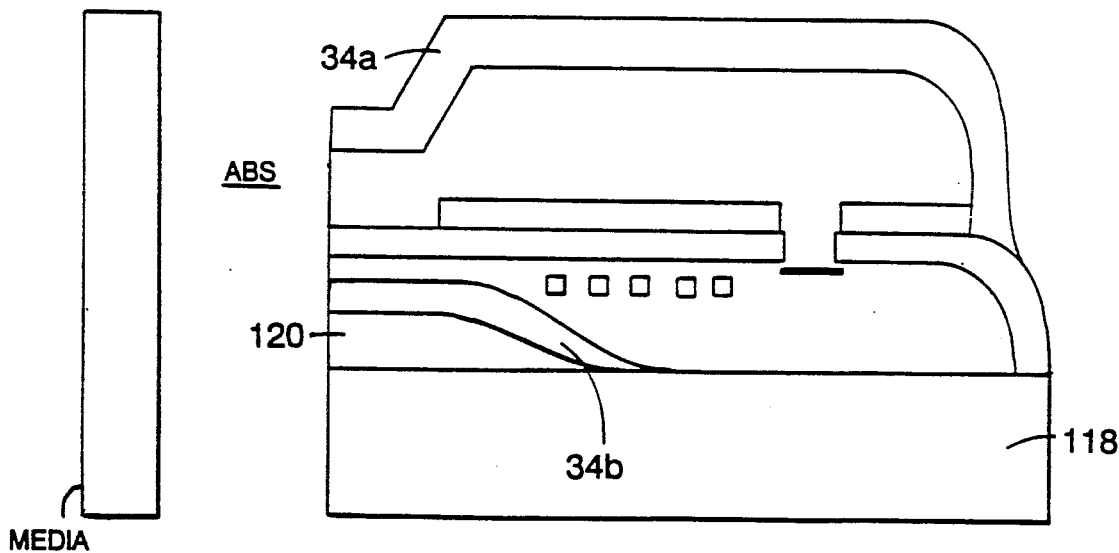
FIG. 30 shows an additional embodiment of the invention having an alternate flux return path.

Another embodiment of the invention is shown in FIG. 30, having in shield sections 34a, 34b (i.e., at least thin at their tips). In addition, an alternate or auxiliary flux return path 118 is provided. More particularly, a ferrite or other magnetic substrate (or NiFe plated over a substrate such as AlSiMag) forms path 118, is coupled to shield 34 in the back closure section, and is separated by insulator 120 from the tip of shield section 34b at the air bearing surface (the media side). Here, shield sections 34a, 34b are relatively thin, as will saturate in writing, but will be active in reading, while path 118 is relatively quite thick to provide an unsaturated return path during writing. The return path being thick has the additional feature of spreading the flux so as not to effect the stored information on the media. As a result, a lower reluctance flux path is provided for increased read/write efficiency. While shown with an MR element, this is by way of example only and without limitation as to the scope of the invention. In a variation of this embodiment, perhaps shield section 34a might be thicker or thinner than shield section 34b, according to design choice.

The MR or Hall element or auxiliary flux conductor of FIGS. 28, 29 and 30 may be made by application of conventional process technology to the novel invention described above. Such a shielded magnetic head may have two outer magnetic poles, the two outer poles acting as the magnetic shield for a center pole, whereby the outer poles can be used for writing and the center pole can be used for reading.

Figure 17:
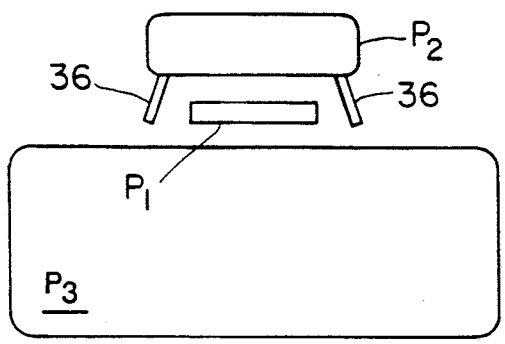
FIG. 17 is a pole tip view of a three-pole read/write head for vertical recording with saturable side shields.

FIG. 17 illustrates a three-pole type of read/write head for vertical recording with saturable side shields 36. During the write process, the two magnetic shields or whiskers 36 saturate. During read, however, the whiskers 36 are fully effective magnetic shields which prevent flux from adjacent transitions from coming into the read pole P1. The whiskers 36 may be formed from the seed layers in the formation of the pole P2.

Figure 18:
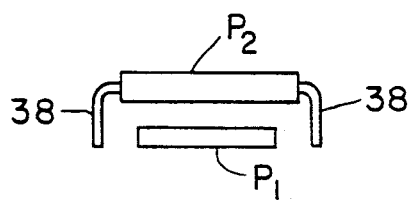
FIG. 18 is a pole tip view of a two-pole head with saturable side shields.

Another embodiment of the invention is shown in FIG. 18 which is a saturable side shield version of FIG. 1. That is, the shields 38 are thinner than the shield portions of the pole P2 of FIG. 1. The thin side shields 38 may be the seed layers during the formation of P2, thus saving the extra process step in depositing the side shields.

Figure 19:
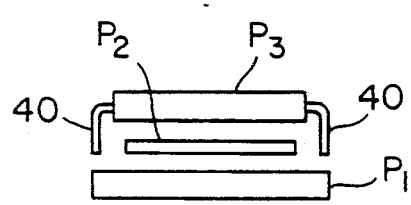
FIG. 19 is a pole tip view of a three-pole head with saturable side shields.
Figure 20:
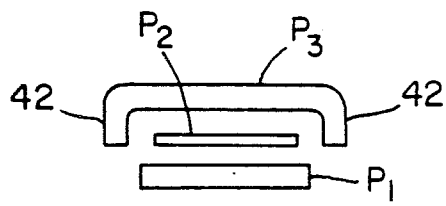
FIG. 20 is a pole tip view of a three-pole head with non-saturable side shields.

FIG. 19 illustrates a three-pole read/write head for longitudinal recording. The central pole P2 may be flux sensing or an inductive type read head. The poles P1-P3 combination acts as a write pole (P2 being smaller in track width than P1 and P3, thus writing wide and reading narrow). Thin side shields 40 are a part of the pole P3. The side shields 40 may constitute the seed layer during the formation of pole P3. The side shields 40 saturate during the write operation and writes wider than read by the narrower track pole P2. Flux is shielded by the side shields 40 during the read operation. FIG. 20 is a version of the embodiment of FIG. 19 with non saturable side shields 42 which are thicker than the side shields 40 in the embodiment of FIG. 19.

Figure 21:
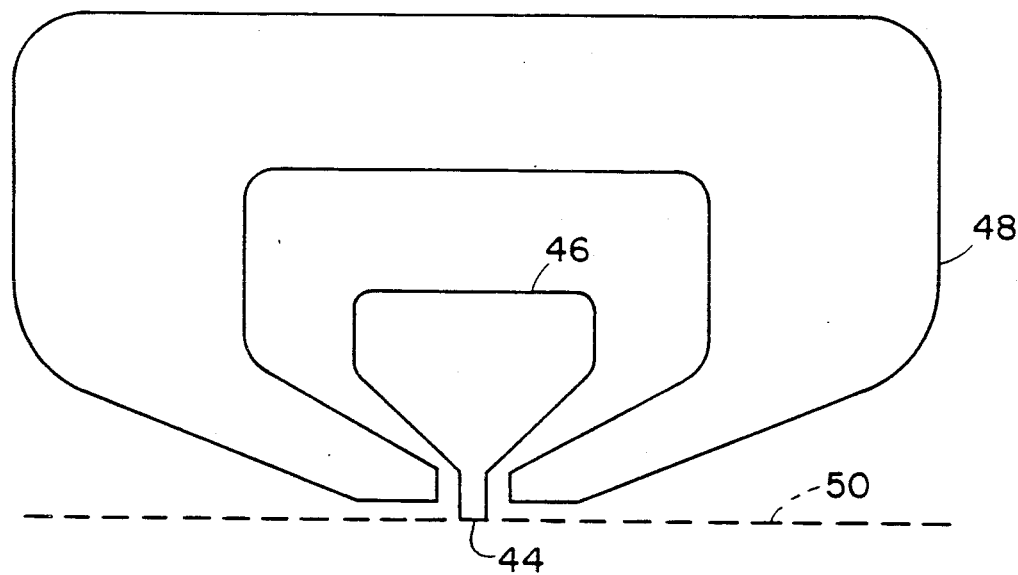
FIG. 21 is a planar view of a two-pole or monopole head with self-grounded side shields.

In FIG. 21 the side shield 48 is self-grounded by virtue of its large area. This type of shield protects the yoke 46 as well as the pole tips 44 from adjacent track flux. The shield does not extend down to the head media interface 50 in order to avoid converting low frequency residual cross talk into higher frequencies. This design is appropriate to monopole and two-pole heads. This design is similar to that shown in FIG. 16. It is thus seen that the magnetic heads including side shields disclosed herein reduce the negative impact of fringing during read and write, allowing for higher track density and a reduced cost per bit stored.

It is recognized that modifications and variations of the present invention will occur to those skilled in the art and it is intended that all such modifications and variations be included within the scope of the appended claims.

What is claimed is:

1. A process for forming a head having at least one pole and a yoke with a back closure region, comprising the steps of:
    (a) providing a substrate workpiece which defines in its top surface a concave feature having desired transverse and longitudinal dimensions,
    (b) depositing a magnetic layer over the workpiece forming a lower shield section, the shield section having a concave region with a surface configuration that generally resembles the concavity of the concave feature of said substrate,
    (c) forming coil winding stripes over the workpiece,
    (d) filling said concave region of the lower shield section with insulating material,
    (e) lapping the product of step (d) down to a flat surface,
    (f) forming a pole upon the flat surface,
    (g) forming another insulating layer and upper coil windings, the latter in continuity with the existing coil strips, over the product of step (f),
    (h) forming an insulating layer with a convex topography over the product of step (g), and
    (i) forming an upper shield section over the product of step (h) in continuity with the lower shield section and the pole in said back closure region, said upper shield section having a configuration that generally resembles the convex topography of step (h).

2. The process of claim 1, wherein step (a) includes forming the concave feature by laser, ion, chemical or mechanical processing.

3. The process of claim 1, wherein step (a) includes forming a thin insulating layer over the substrate.

4. The process of claim 3, wherein said substrate is AlSiMag and the thin insulating layer is comprised of $Al_2O_3$.

5. The process of claim 1, wherein step (c) is preceded by the step of depositing an optional insulating layer over the lower shield section.

6. The process of claim 1, wherein step (f) is preceded by the step of forming an alumina layer in a region of the workpiece over which a tip of said pole will be formed.

7. The process of claim 1, wherein the lower shield section has a back closure region which is confined within the transverse dimensions of the lower shield but located beyond the longitudinal dimensions of the concave region.

8. The process of claim 1, wherein step (c) includes forming the ends of the stripes to extend transversely along the track width direction beyond the dimensions of the lower shield concave region.

9. The process of claim 8, wherein in step (d) the insulating material is photoresist and wherein at least a portion of the ends of the stripes, the back closure region, and the lower shield section are exposed for conductivity purposes.

10. The process of claim 1, wherein step (g) is preceded by the step of forming an MR sensor to be located adjacent to the pole.

11. The process of claim 1, wherein step (g) is preceded by the step of forming a Hall sensor to be located adjacent to the pole.

12. The process of claim 1, wherein the upper and lower shield sections are formed thin at least at their tips.

13. The process of claim 1, wherein the upper and lower shield sections ar formed thick at least at their tips.

14. The process of claim 1, further including the step of forming an alternate flux return path coupled to at least one of the shield sections, this shield section separated from the alternate flux return path by a non-magnetic insulation layer.

15. The process of claim 1, wherein step (e) may include lapping until continuity is detected between a part of the lapping system and at least one of the formed coil stripes, and adjusting lapping accordingly.

16. The process of claim 7, wherein the concave region defines a cavity, and further including the step of forming a via in the back closure region beyond the cavity to facilitate connection of the shield sections and the pole.

17. A process for forming a magnetic head comprising the steps of:
providing a substrate workpiece which defines in its top surface a concave feature having desired transverse and longitudinal dimensions,
depositing a magnetic layer over the workpiece, the layer having a concave region with a surface configuration that generally resembles the concavity of the concave feature of said substrate, and
forming upon said workpiece a pole having a first region separated from said magnetic layer and a second region that contacts said magnetic layer,
said magnetic layer being configured with respect to said pole to serve as a magnetic shield for said pole during operation of said head with a magnetic storage medium.

18. A process for forming a magnetic head comprising the steps of:
(a) providing a substrate workpiece which defines in its top surface a concave feature having desires transverse and longitudinal dimensions, and
(b) depositing a magnetic layer over the workpiece, the layer having a concave region with a surface configuration that generally resembles the concavity of the depressed feature and comprising a lower shield section,
(c) filling said concave region of the lower shield section with filler material,
(d) forming a pole upon the workpiece,
(e) forming an insulating layer with a convex topography over the workpiece, and
(f) forming an upper shield section over the product of step (e) in continuity with the lower shield section and the pole so that said upper shield section has a configuration that generally resembles the convex topography of step (e).

19. The process of claim 17 wherein said step of providing said substrate includes forming the concave feature by laser, ion, chemical or mechanical processing.

20. The process of claim 17 wherein said substrate is AlSiMag covered by a thin insulating layer comprised of $Al_2O_3$.

21. The process of claim 18 wherein step (c) is preceded by the step of depositing an insulating layer over the lower shield section.

22. The process of claim 18 wherein step (d) is preceded by the step of forming an alumina layer in a region of the workpiece over which a tip of said pole will be disposed.

23. The process of claim 18 wherein the lower shield section has a closure region which is confined within the transverse dimensions of the lower shield but located beyond the longitudinal dimensions of the concave region.

24. The process of claim 18 wherein step (c) is preceded by the step of forming coil winding stripes over the workpiece.

25. The process of claim 24 further including forming the ends of the stripes to extend transversely along the track width direction beyond the dimensions of the lower shield concave region.

26. The process of claim 25 wherein the filler material is an insulating material and step (d) is preceded by lapping the product of step (c) to a flat surface.

27. The process of claim 26 wherein the insulating material is photoresist and wherein at least a portion of the ends of the stripes, the closure region, and the lower shield section are exposed for conductivity uses.

28. The process of claim 24 wherein step (e) is preceded by the step of forming an insulating layer and upper coil windings on the workpiece, the latter windings in continuity with the existing coil stripes.

29. The process of claim 28 wherein step (e) is preceded by the step of forming an MR sensor located adjacent to the pole.

30. The process of claim 18 wherein step (e) is preceded by the step of forming a Hall sensor located adjacent to the pole.

31. The process of claim 18 wherein the upper and lower shield sections are formed thin at least at their tips.

32. The process of claim 18 wherein the upper and lower shield sections are formed thick at least at their tips.

33. The process of claim 18 further including the step of forming an alternative flux return path coupled to at least one of the shield sections, this shield section separated from the alternate flux return path by a non-magnetic insulation layer.

34. The process of claim 25 wherein the lapping progresses until continuity is detected between a part of the lapping system and at least one of the formed coil strips.

35. The process of claim 23 wherein the concave region defines a cavity, and further including the step of forming a via in the closure region beyond the cavity to facilitate connection of the shield sections and the pole.

36. The process of claim 28 wherein the coil is solenoidal.

37. The process of claim 18 wherein the pole at least at a tip thereof is formed with high permeability and high saturation magnetization.

38. The process of claim 37 wherein the pole is formed with a cobalt zirconium alloy.

39. The process of claim 17 further comprising forming a second magnetic layer upon said workpiece so that a first region of said second magnetic layer is separated from said first region of said pole and a second region of said second magnetic layer is in contact with said second region of said pole.

40. The process of claim 39 further comprising configuring said second magnetic layer with respect to said pole to serve as a magnetic shield therefor during operation of said head with said magnetic storage medium.

41. The process of claim 17 wherein said step of forming said pole comprises
depositing a non-magnetic material over said concave region of said magnetic layer,
causing an upper surface of said non-magnetic material to be substantially flat; and
forming at least a portion of said pole on said substantially flat upper surface.

42. The process of claim 39 wherein said step of forming said second magnetic layer includes
depositing a non-magnetic material over said pole so that said non-magnetic material is relatively thin over said first region of said pole and is relatively thick over a third region of said pole aligned with said concave region of said first magnetic layer, and
forming said second magnetic layer over said non-magnetic material, whereby said magnetic layers are separated by a greater amount near said third region of said pole than near said first region of said pole.

43. The process of claim 17 further comprising forming a sensor adjacent to at least a portion of said pole for detecting magnetic flux conducted through said pole during said operation.

44. The process of claim 43 wherein said sensor is an inductive sensor.

45. The process of claim 43 wherein said sensor is a magneto-resistive (MR) sensor.

46. The process of claim 43 wherein said sensor is a Hall sensor.

47. The process of claim 39 further comprising configuring at least one of said first magnetic layer or said second magnetic layer so that said layer will become saturated with magnetic flux when said head performs write operations on said medium.

48. The process of claim 39 further comprising configuring at least one of said first magnetic layer or said second magnetic layer so that said layer will not become saturated with magnetic flux when said performs write operations on said medium.

49. The process of claim 39 further comprising connecting said first magnetic layer and said second magnetic layer together in at least the first regions thereof, whereby a radial magnetic shield is provided for at least said first region of said pole.

50. A process for forming a head having at least one pole and a yoke with a back closure region, comprising the steps of:
(a) providing a substrate workpiece which defines in its top surface a concave feature having desired transverse and longitudinal dimensions,
(b) depositing a magnetic layer over the workpiece forming a lower shield section, the lower shield section having a concave region with a surface configuration that generally resembles the concavity of the concave feature of said substrate,
(c) filling said concave region of the lower shield section with filler material,
(d) forming a pole upon the workpiece,
(e) forming an insulating layer with a convex topography over the workpiece, and
(f) forming an upper shield section over the product of step (e) in continuity with the lower shield section and the pole in said back closure region, said upper shield section having a configuration that generally resembles the convex topography of step (e).

51. The process of claim 50 wherein said head is a monopole head.

52. The process of claim 1 wherein said head is a monopole head.

* * * * *

UNITED STATES PATENT AND TRADEMARK OFFICE
CERTIFICATE OF CORRECTION

PATENT NO. : 5,075,956
DATED : December 31, 1991
INVENTOR(S) : Shyam C. Das It is certified that error appears in the above-identified patent and that said Letters Patent is hereby corrected as shown below:

```
Line 3 in the Abstract, "sheild" should be --shield--.

Col. 1, line 36, "Hall type" should be --Hall-type--.

Col. 2, line 65, after "the" insert --feature--.

Col. 4, line 22, "cross sectional" should be --cross-sectional--.
        line 25, "28 29" should be --28-29--.

Col. 7, line 35, "cross sec" should be --cross-sec--.

Col. 8, lines 10-11, "out lying" should be --out-lying--.

Col. 10, line 47, "strips" should be --stripes--.

Col. 11, line 27, "ar" should be --are--.
```

Signed and Sealed this

Thirteenth Day of July, 1993

Attest:

MICHAEL K. KIRK

*Attesting Officer*     Acting Commissioner of Patents and Trademarks